United States Patent [19]
Garcia et al.

[11] Patent Number: 6,048,569
[45] Date of Patent: *Apr. 11, 2000

[54] COMESTIBLE LIQUID SEA SALT HAVING A LOW SODIUM CONTENT AND METHOD FOR PRODUCING THE SAME

[76] Inventors: Fernando Horacio Garcia; Hector Marcelo Mugas, both of Chacabuco 380, PISO 3°, Buenos Aires, Argentina, 1069

[ * ] Notice: This patent issued on a continued prosecution application filed under 37 CFR 1.53(d), and is subject to the twenty year patent term provisions of 35 U.S.C. 154(a)(2).

[21] Appl. No.: 08/879,808
[22] Filed: Jun. 20, 1997

[30] Foreign Application Priority Data

Jun. 21, 1996 [AR] Argentina ............... P96 01 03249

[51] Int. Cl.⁷ .................................................. A23L 1/237
[52] U.S. Cl. ..................... 426/649; 426/492; 426/521; 426/806; 423/499.1; 203/DIG. 17
[58] Field of Search ............................. 426/648, 649 R, 426/492, 521, 806, 248; 203/DIG. 17; 423/499.1; 159/3, DIG. 25; 422/186.3

[56] References Cited

U.S. PATENT DOCUMENTS

| | | | |
|---|---|---|---|
| 2,606,839 | 8/1952 | Evans | 426/649 |
| 2,854,341 | 9/1958 | Waldo | 99/143 |
| 3,097,952 | 7/1963 | Bressette | 99/143 |
| 4,107,346 | 8/1978 | Kravitz | 426/648 |
| 4,334,886 | 6/1982 | Tani et al. | 23/303 |
| 5,632,153 | 5/1997 | Ricklefs et al. | 62/85 |

FOREIGN PATENT DOCUMENTS

WO 86/05954  10/1986  WIPO .
WO 89/05683   6/1989  WIPO .

*Primary Examiner*—Nina Bhat
*Attorney, Agent, or Firm*—Jacobson, Price, Holman & Stern, PLLC

[57] ABSTRACT

A comestible liquid sea salt preparation and method for producing the same. The comestible preparation is produced from sea water and is low in sodium, about 9.8 wt %, therefore making it suitable for consumption by persons having cardiac disorders, arterial hypertension, renal disorders, endemias and the like. Even though the amount of sodium is reduced the preparation is able to maintain a suitable gustatory sensation, making it an advantageous substitute for regular table salt. The method for producing the preparation involves a series of steps in which sea water is decanted, evaporated, converted into a spray; and concentrated. The preparation also undergoes a micro plankton regulation step and sodium chloride is added to the resulting preparation so that the concentration of sodium chloride is 25 percent of the total preparation.

11 Claims, No Drawings

COMESTIBLE LIQUID SEA SALT HAVING A LOW SODIUM CONTENT AND METHOD FOR PRODUCING THE SAME

The invention relates to a comestible liquid sea salt preparation having low sodium content, and a method of preparing the same.

The method starts with sea water which is decanted and evaporated, following which the residue is crushed and the product is sterilized.

The area of applicability of the invention is the food industry, particularly for seasoning and flavoring of foods for persons with prescribed daily diets.

BACKGROUND OF THE INVENTION

In the current state of the art, there is no known application of liquid salts of marine origin for human consumption.

The liquid salt preparation obtained according to the invention has desirable characteristics and is advantageous for the general populace as well as for dieting individuals. It has a high salt gustatory potency, with a sodium content of only 9.8 wt. %.

The carbonates and bicarbonates in the preparation, in combination with the other components, have pH-regulating effects in the organism consuming the liquid sea salt preparation.

The pH of the preparation according to the invention is slightly alkaline, making it suitable for persons with gastrointestinal disturbances or disorders.

The aqueous composition ("saline hydrolysis") of the salt obtained according to the invention is derived from salts of weak acids and strong bases, as is characterized by the anions carbonate, bicarbonate, iodide, and bromide.

The qualitative composition of the salt has some similarity to that of human blood plasma.

The liquid salt preparation according to the invention is of marine origin having a low sodium content which makes it suitable for consumption by all persons, and particularly persons having cardiac disorders, arterial hypertension, renal disorders, edemas, etc.

The method for obtaining the sea salt preparation according to the invention is essentially as follows: Sea water is pumped into a shallow tank having a surface area of about 2 hectares, for decantation and evaporation. The height of the tank varies, being 70 cm at the inlet, 15 cm in the middle region, and 1 m at the outlet. In the region of the outlet, at the height of the opening for the water, the tank communicates, via a system of conduits, to a rectangular spray tank of area 2 hectares, where a pump delivering 200 cu m/hr converts the saline solution into a spray, which, after being suitably concentrated, is delivered to a decantation tank.

Then, at the concentration obtained, means of regulating the microplankton content are applied, and sodium chloride is added to provide a concentration of 25% NaCl.

Pure water is not an electrical conductor. Water at 20° C. has dielectric constant 80, meaning 80 times less conductivity than a vacuum.

If a salt is dissolved in pure water, the water becomes an electrical conductor.

The reason for the conductivity is that the salt ionizes, and the conduction occurs via the ions.

The taste buds themselves are sensitive to electrical impulses, and thus taste-sensations result from dissolved sodium chloride ions.

The proposed liquid salt is responsible for various phenomena which potentiate the salt taste, even though the preparation contains only 9.8 wt. % sodium.

The phenomena which participate in the process of gustatory sensation are the following:
1. Electrolytic dissociation;
2. Buffer effect;
3. Solution pH;
4. Saline hydrolysis;
5. Qualitative composition of the solution;
6. Equivalent conductivity of the solution.

1. Electrolytic Dissociation:

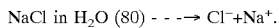

$$NaCl \text{ in } H_2O \; (80) \dashrightarrow Cl^- + Na^+.$$

2. Buffer Effect:

The carbonates and bicarbonates in the preparation, in combination with the other components, have pH-regulating effects in the organism.

3. Solution pH:

The pH of the solution is in the range 7.3–8, which is slightly alkaline, making it suitable for persons with gastrointestinal disturbances or disorders.

4. Saline Hydrolysis:

The saline hydrolysis, in the case of the described salt, comes from salts of weak acids with strong bases, as is characterized by the anions carbonate, bicarbonate, iodide, and bromide.

5. Qualitative Composition of the Solution:

The qualitative composition of the salt has some similarity to that of human blood plasma.

6. Equivalent Conductivity of the Solution:

According to Ostwald, the maximum equivalent conductivity is obtained at infinite dilution.

Accordingly, the gustatory potency of the proposed salt is maximized, based on these considerations.

The basic gravimetric equation is:

weight of solution=weight of solute+weight of solvent.

100 g=25 g salt+75 g $H_2O$ .

The relative atomic weights are: Cl 35.5, Na 23, NaCl 58.5.

Then 25 g salt×23/58.5=9.83, i.e. the amount of Na in 100 g solution is 9.83 g.

Further, Na represents 23/58.5=39.32 wt. % of the solid salt (NaCl), i.e. 39.32 g Na in 100 g solid salt.

The amount of sodium in 100 g of the solution is thus much less than in 100 g of the salt, yet 100 g of the solution has the same gustatory potency as 100 g of the salt.

Since Na ion is monovalent, in milliequivalents we have:

1 meq Na=0.023 g Na;

accordingly, 9.83 g Na =427 meq Na.

This 427 meq Na is the amount in 100 g of the described solution.

The density of the solution is 1.19 g/cc. The volume of 100 g of the solution is 100/1.19=84 cc.

Thus, 427 meq Na is contained in 84 cc solution; hence 1 cc solution contains 5 meq Na.

The analysis of the product obtained is as follows:

| | |
|---|---|
| Chloride (Cl$^-$) | 15.17 wt. % |
| Sulfate (SO$_4^{-2}$) | 0.29 wt. % |
| Sodium bicarbonate (NaHCO$_3$) | 0.017 wt. % |
| Nitrate (NO$_3^-$) | <1 mg/L |
| Potassium (K$^+$) | 0.029 wt. % |
| Sodium (Na$^+$) | 9.75 wt. % |
| Calcium (Ca$^{++}$) | 0.066 wt. % |
| Magnesium (Mg$^{++}$) | 0.1 wt. % |
| Water | remainder |
| pH = log ([H$^+$])$^-$1 | 7.3–8 |

Before the product is bottled, it is filtered and is sterilized with ultraviolet rays.

The filling device, for example, a funnel and the like used is comprised of materials suitable for use with solutions of high salt concentrations.

It may be appreciated from the above description that the method and preparation according to the present invention provide substantial advantages and represent an improvement in the art.

What is claimed is:

1. A method for producing a comestible liquid sea salt preparation comprising the steps of:
   pumping sea water into a first tank;
   decanting and evaporating the pumped sea water in the first tank;
   transporting the decanted and evaporated sea water to a second tank via a system of conduits and at the second tank converting the sea water into a spray;
   concentrating the sea water at the second tank and delivering the concentrated sea water to a third tank where further decantation is carried out;
   regulating the micro plankton content in the sea water;
   adding sodium chloride so that the concentration of sodium chloride in the resulting preparation is 25 percent of the total preparation; and
   obtaining a liquid sea salt having a sodium concentration of no more than 9.8 wt %.

2. The method of claim 1 wherein the first tank has a surface area of about 2 hectares.

3. The method of claim 1 wherein the first tank has an inlet having a height of about 70 cm, a middle region having a height of about 15 cm and an outlet having a height of about 1 m.

4. The method of claim 1 wherein the sea water is converted into a spray using a pump which delivers 200 cu m/hr.

5. The method of claim 1 wherein regulation of the micro plankton content takes place in the third tank.

6. The method of claim 1 further comprising filtering and sterilizing the preparation with ultraviolet rays.

7. A comestible liquid sea salt preparation obtainable from the method of claim 1.

8. A comestible liquid sea salt preparation comprising about 15.17% chloride, about 0.29% sulfate, about 0.0170% sodium bicarbonate; less than 1 mg/L nitrate; about 0.029% potassium; about 9.75% sodium; about 0.066% calcium; about 0.1% magnesium; and water; wherein the percentages are by weight of the total preparation and the preparation has a pH of between 7.3–7.8.

9. The comestible liquid sea salt preparation of claim 8 wherein the preparation is produced by pumping sea water into a first tank; decanting and evaporating the pumped sea water; transporting the decanted and evaporated sea water to a second tank via a system of conduits and converting the sea water into a spray; concentrating the sea water at the second tank and delivering the concentrated sea water to a third tank where further decantation is carried out; regulating the micro plankton content in the sea water; and adding sodium chloride so that the concentration of sodium chloride in the resulting preparation is 25 percent of the total preparation.

10. The comestible liquid sea salt preparation of claim 9 further comprising filtering and sterilizing the sea water with ultraviolet rays.

11. A food product comprising the comestible sea salt of claim 9.

* * * * *